United States Patent

[11] 3,548,813

| [72] | Inventor | Arthur J. Berner<br>138 Farmstead Lane, Glastonbury, Conn. 06033 |
|---|---|---|
| [21] | Appl. No. | 767,358 |
| [22] | Filed | Oct. 14, 1968 |
| [45] | Patented | Dec. 22, 1970 |

[54] VECTORCARDIOGRAPH ANALYZER
5 Claims, 7 Drawing Figs.

| [52] | U.S. Cl. | 128/2.06 |
|---|---|---|
| [51] | Int. Cl. | A61b 5/04 |
| [50] | Field of Search | 128/2.06 |

[56] References Cited
UNITED STATES PATENTS
2,659,363   11/1953   Brosselin ..................... 128/2.06
3,186,403   6/1965   Bassett ........................ 128/2.06

FOREIGN PATENTS
508,601   1/1955   Italy ............................ 128/2.06

*Primary Examiner*—William E. Kamm
*Attorney*—Prutzman, Hayes, Calb & Chilton

ABSTRACT: A vectorcardiograph analyzer receiving input signals proportional to the X, Y, and Z components of the heart vector and for deriving a signal proportional to the spatial magnitude of the heart vector, a signal proportional to the spatial derivative of the vector and signals proportional to orientation angles of the vector. One embodiment provides three orientation angles and another embodiment defines the position of the vector with only two orientation angles.

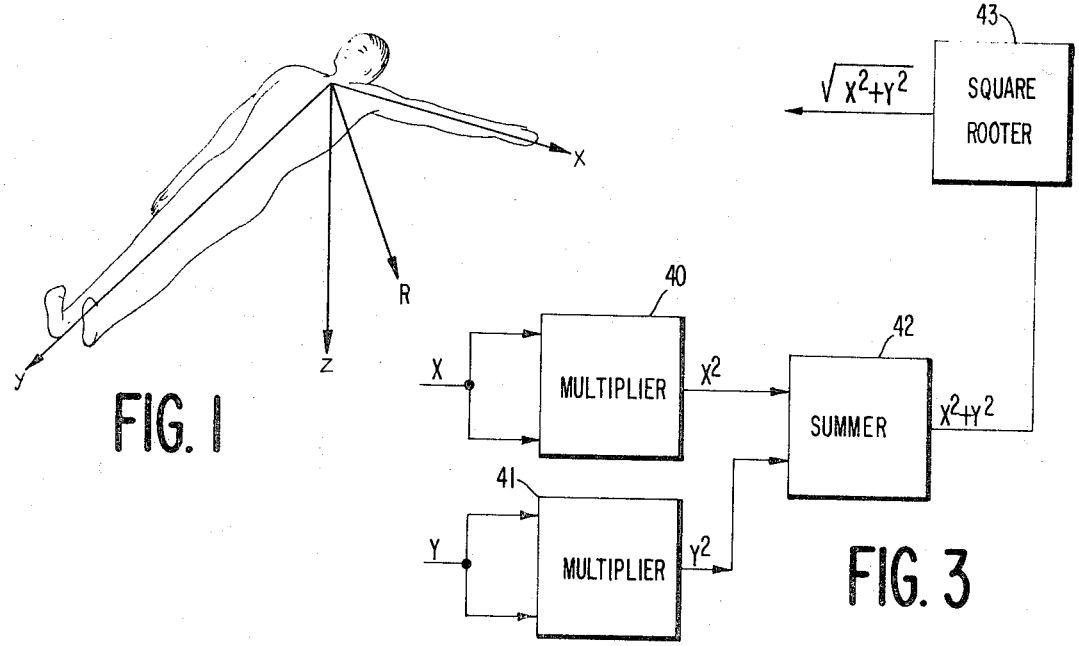
FIG. 1
FIG. 3
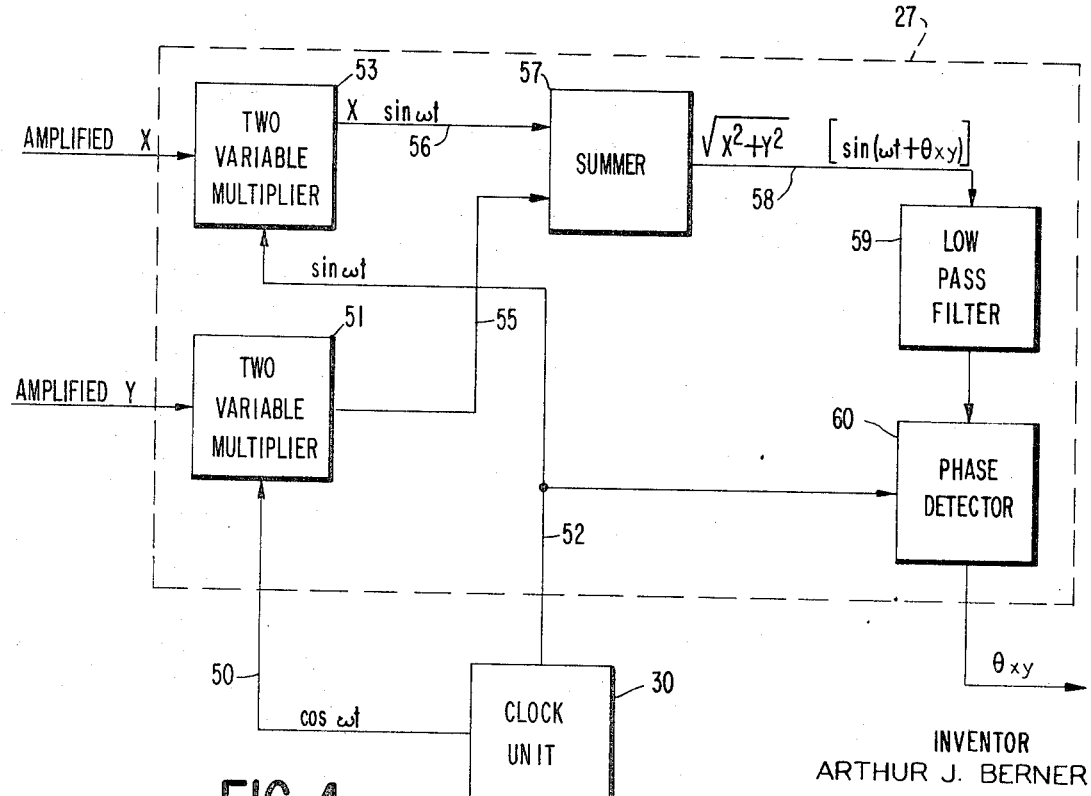
FIG. 4
INVENTOR
ARTHUR J. BERNER
BY
Lindsey, Prutzman and Hayes
ATTORNEYS

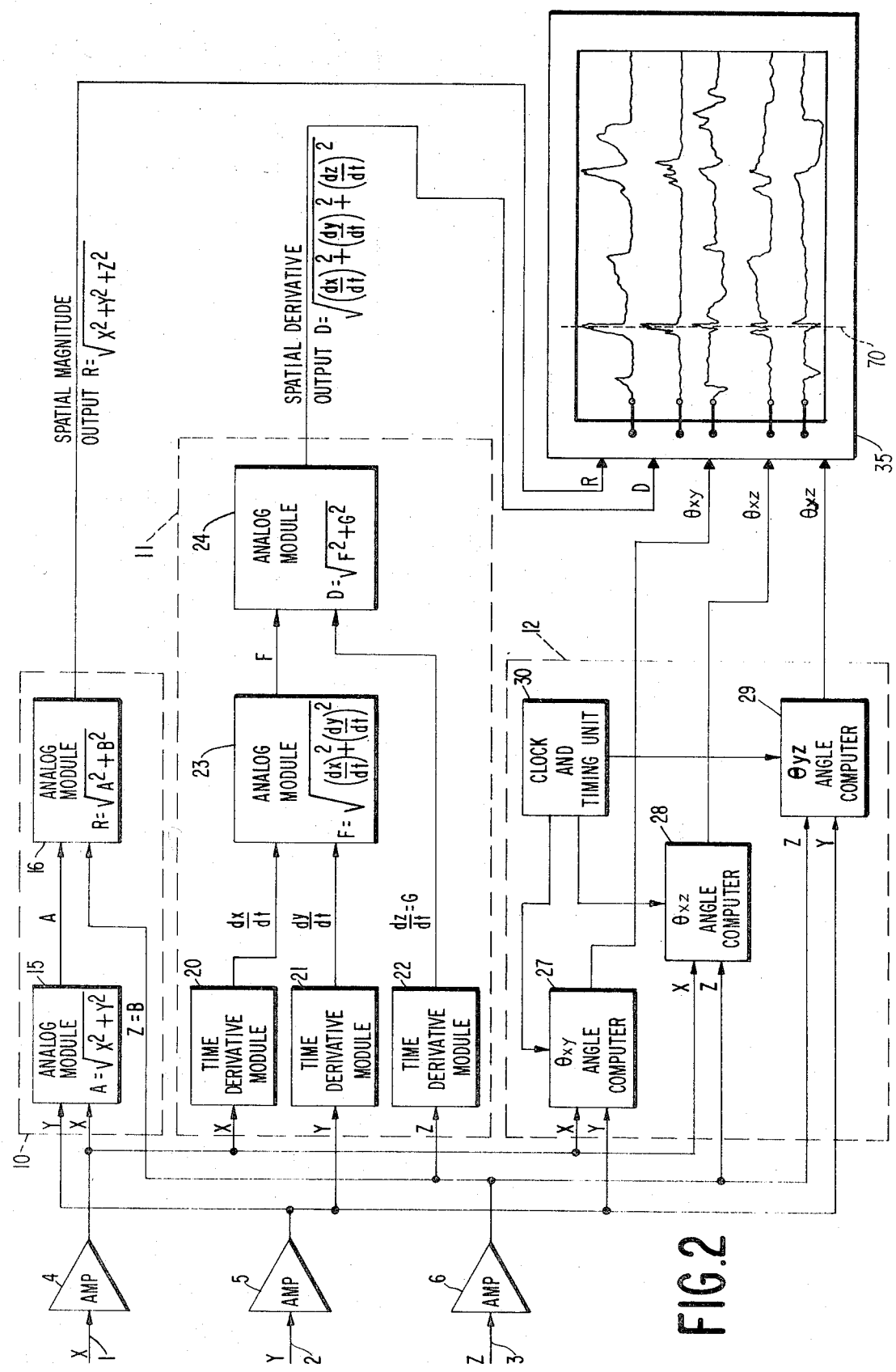

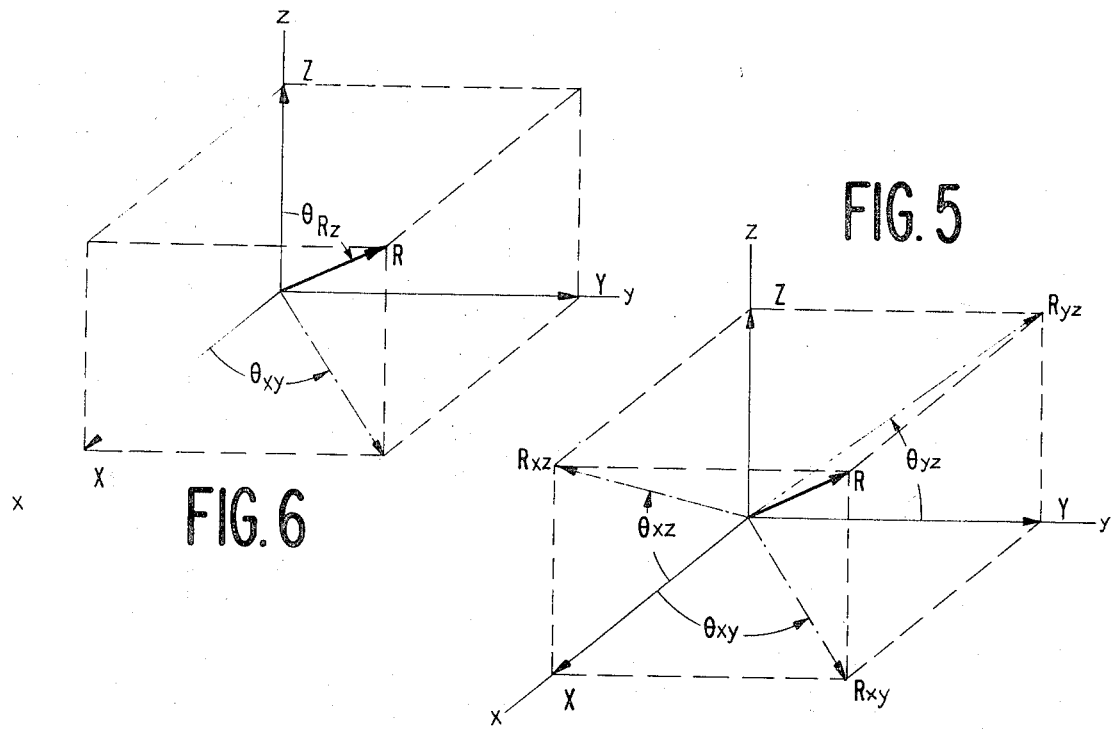
FIG. 5
FIG. 6
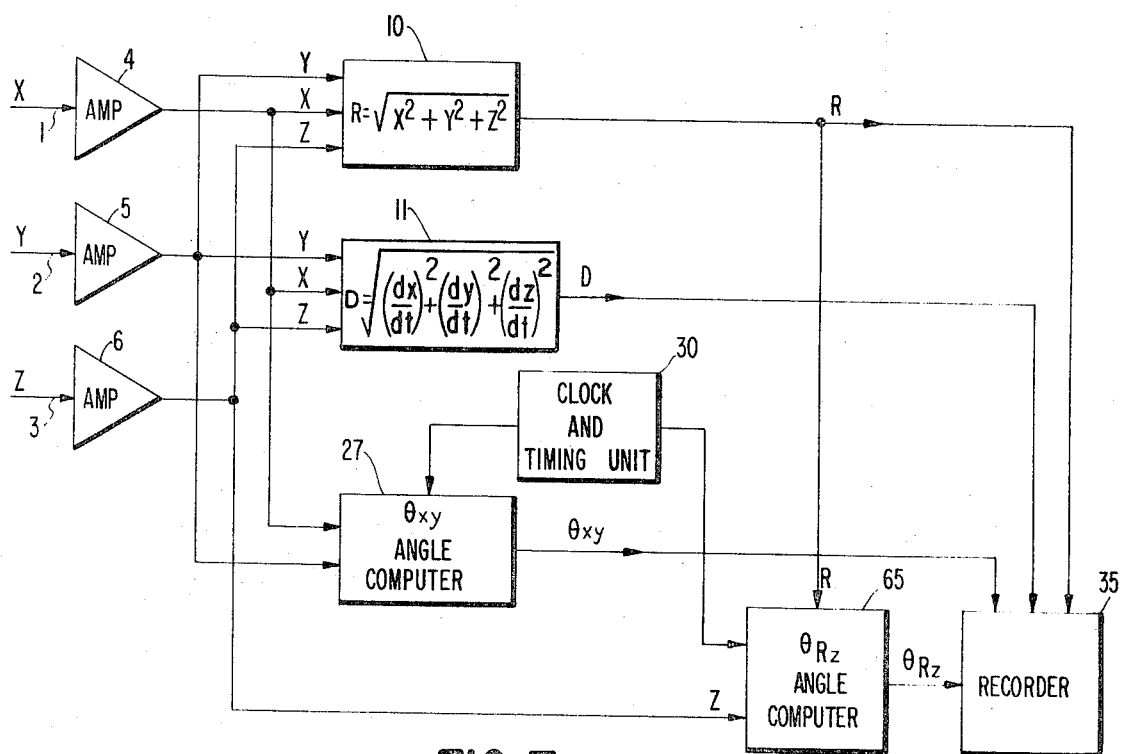
FIG. 7

VECTORCARDIOGRAPH ANALYZER

BACKGROUND OF THE INVENTION

1. Field of the Invention

This invention relates to a novel diagnostic tool for the study of heart functioning.

2. Description of the Prior Art

The electrocardiograph (ECG) is a common diagnostic tool used by physicians to monitor the electrical impulses of the heart and to record them on a chart to determine the condition of the heart.

The heart vector is a representation of all electrical heart activity at any given moment. By placing electrodes at various predetermined positions on the body, and by measuring the potential induced on these electrodes, the magnitude of the vector can be computed.

The spatial magnitude, the spatial derivative, and the direction of the heart vector are all elements of information which enable one to distinguish between a healthy heart and a failing heart. With the common ECG there is no direct indication given of the direction of the heart vector, and the direction must be deduced or computed. The common ECG also provides magnitude information for directional components of the heart vector, but does not provide a magnitude indication for the total heart vector. Finally, the common ECG does not provide a direct indication of the spatial derivative of the heart vector.

One prior art device for overcoming some of these problems was disclosed by Moore et al., in an article entitled "The polarcardiograph: An analogue computer that provides spherical polar coordinates of the heart vector," published Sept., 1962 in the American Heart Journal, volume 64, number 3, pages 382—391.

The Moore et al. system does provide output signals indicating the spatial magnitude and direction of the heart vector. However, the Moore et al. system does not provide an indication of the spatial derivative of the vector. The use of a spatial derivative indication allows one to distinguish between two different heart diseases in which the spatial magnitude and direction signals may be the same but in which the spatial derivative signals differ.

The Moore et al. system uses direct coupled amplifiers which require the use of a clamping circuit to maintain a DC reference level, thereby correcting for DC offset voltages caused by differences in skin potential.

SUMMARY OF THE INVENTION

The present invention involves a relatively inexpensive design which computes a spatial magnitude signal to show the size of the heart vector. It also provides a spatial derivative signal to show the vector sum of the components of change of the heart vector and orientation angle signals to show the position of the heart vector.

In the present invention, the orientation angles and spatial magnitude are computed separately which allows wide bandwidth for the magnitude computation and limiting of bandwidth for computing orientation angles. The present invention also eliminates the need for clamping circuits.

BRIEF DESCRIPTION OF THE DRAWINGS

FIG. 1 illustrates an individual on his back and is used to define the coordinate system used in the present invention.

FIG. 2 is an overall block diagram of one embodiment of the invention.

FIG. 3 is a block diagram of a device for determining the square root of the sum of two squares.

FIG. 4 is a block diagram of a device for determining the angle between a resultant vector and one of the two orthogonal component vectors which make up the resultant. This device is used in the circuits of FIGS. 2 and 7.

FIGS. 5 and 6 illustrate coordinate systems embodying the angles calculated by the circuits of FIGS. 2 and 7 respectively.

FIG. 7 is a block diagram of an alternative embodiment of the invention.

DESCRIPTION OF THE PREFERRED EMBODIMENTS

FIG. 1 illustrates an individual on his back with his left arm extended. This FIG. illustrates the coordinate system used to determine the direction of the heart vector. The $x$ direction extends from the heart through the left arm. The $y$ direction extends from the heart through the left leg. The $z$ direction extends from the heart directly downward through the back of the subject. The heart vector is shown as a vector R in a coordinate system whose $x$, $y$ and $z$ directions are determined by the position of the subject.

There are numerous systems for placing electrodes at various points on the body of the subject to derive signals proportional to the components of the heart vector in each of the three orthogonal ($x$, $y$ and $z$) directions. One such system is disclosed by Frank, "An Accurate, Clinically Practical System for Spatial Vector Cardiography," Circulation, volume 13, pages 737—747, May 1956. Another system is shown by McFee et al., "An Orthogonal Lead System for Clinical Electrocardiography," American Heart Journal, Jul. 1961, pages 93—100. There are also several other systems for deriving orthogonal output signals. Any of these systems can be used to provide the X, Y and Z signals used at the input of the circuit according to the present invention.

FIG. 2 is a block circuit diagram of one embodiment of the present invention. Three signals, X, Y and Z, representing the $x$, $y$, and $z$ components of the heart vector, respectively arrive on lines 1, 2 and 3 at the input terminals of amplifiers 4, 5 and 6. Amplifiers 4, 5 and 6 are AC coupled amplifiers, with which no clamping is needed. Such amplifiers amplify AC signal components and do not pass DC signal components, thus maintaining the DC level of the output.

The amplified X, Y and Z signals are applied to three computers 10, 11 and 12. Computer 10 is a spatial magnitude computer for determining the magnitude of the heart vector. Computer 11 is a spatial derivative computer for determining the spatial derivative of the heart vector. Computer 12 is an angle computer for determining the angles which define the direction of the a heart vector with respect to the $x$, $y$ and $z$ axes.

Spatial magnitude computer 10 received amplified X, Y and Z signals. Two of these amplified signals, for example, X and Y, are applied to an analogue module 15 designed to provide an output signal proportional to the square root of the sum of the squares of the two input signals. Analogue module 15 may be one of the type which is commercially available, or it may be constructed from elements as shown in FIG. 3. The two multipliers 40 and 41, the summer 42, and the square rooter 43 of FIG. 3 are all well-known in the analogue computer art.

Analogue module 15 provides an output signal A proportional to the square root of the sum of the squares of the X and Y input signals. Signal A is applied to an analogue module 16, possibly through an interface (not illustrated) which provides any necessary scaling up or down. A signal B, corresponding to the amplified Z signal, is applied to a second input of analogue module 16, possibly through an interface (not illustrated) which provides any necessary scaling up or down of the signal B. Module 16 is constructed in a manner similar to that of module 15 and is designed to provide an output proportional to the square root of the sum of the squares of the input signals. An output signal R, corresponding in size to the spatial magnitude of the heart vector, is provided at the output terminal of module 16. It can be seen that the magnitude of signal R is proportional to the square root of the sum of the squares of the three input signals, X, Y and Z.

Spatial derivative computer 11 receives the three amplified X, Y and Z signals to provide a spatial derivative output signal D. The three amplified signals X, Y and Z are applied, in the computer 11, to respective time derivative modules 20, 21 and 22. These modules respectively provide output signals proportional to $$\frac{dx}{dt}, \frac{dy}{dt}, \text{ and } \frac{dz}{dt}.$$

These time derivative signals are applied to analogue modules 23 and 24, which are similar in construction and arrangement to modules 15 and 16. Thus, the spatial derivative output signal D is proportional to the square root of the sum of the squares of the time derivatives of the three input signals X, Y and Z.

Angle computer assembly 12 computes the respective angles of the spatial magnitude vector R in each of the three planes $xy$, $xz$, and $yz$. Angle computer assembly 12 includes an $xy$ angle computer 27, an $xz$ angle computer 28, and a $yz$ angle computer 29. A clock and timing unit 30 provides a timing signal to each of the three angle computers 27, 28 and 29.

FIG. 4 is a more detailed block diagram of angle computer 27. Angle computers 27, 28 and 29 are identical except for their input signals. Clock unit 30 provides a $\cos\omega t$ output on line 50 to a two variable multiplier 51 and a $\sin\omega t$ output on line 52 to a two variable multiplier 53. The amplified X signal is applied to a second input of multiplier 53 and the amplified Y signal is applied to a second input of multiplier 51. Multiplier 51 yields an output signal proportional to Y $\cos\omega t$ on line 55. Multiplier 53 yields an output signal proportional to X$\sin\omega t$ on output line 56. These two signals are applied to the input of a summer 57 to yield a resultant signal on line 58 which is proportional to $\sqrt{x^2+y^2}$ [sin $(\omega t + \theta_{xy})$].

The signal on line 58 is applied to low-pass filter 59 to eliminate higher harmonic signals and to provide an output to phase detector 60. Phase detector 60 is also provided with an input on line 52 from clock unit 30 proportional to $\sin\omega t$.

By comparing the phase of the signal on line 52 with the phase of the signal from filter 59, phase detector 60 generates an output signal $\Theta_{xy}$ proportional to the phase difference. This signal $\Theta_{xy}$ is also proportional to the orientation angle of the heart vector in the $xy$ plane. By applying appropriate input signals, the circuit of FIG. 4 can also be used as angle computers 28 and 29.

The signals R, D, $\Theta_{xy}$, $\Theta_{xz}$ and $\Theta_{yz}$ in FIG. 2 are applied to a recorder 35 or other device for display or recording.

FIG. 5 illustrates a coordinate system embodying the angles which are calculated by the circuit of FIG. 2. The system provides $x$, $y$ and $z$ coordinate axes. A heart vector R extends from the origin out into three-dimensional space. The heart vector R can be broken down into three orthogonal components X, Y and Z. Also illustrated is the projection of the vector R into each of the three planes $xy$, $xz$, and $yz$. These three components are $B_{xy}$, $R_{xz}$, and $R_{yz}$. The angle between the $x$ axis and the $R_{xy}$ vector is designated $\Theta_{xy}$. The angle between the $x$ axis and the $R_{xz}$ vector is designated $\Theta_{xz}$. The angle between the $y$ axis and the $R_{yz}$ vector is designated $\Theta_{yz}$.

FIG. 6 illustrates a coordinate system as used by the circuit of FIG. 7, to be explained later, for defining the orientation of the vector R with only two angles. The $\Theta_{xy}$ angle is designated as in FIG. 5. However, the additional angle which is calculated is taken between the $z$ axis and the heart vector R, and is designated $\Theta_{Rz}$. Thus, two angles and one magnitude fully define the size and position of the heart vector R.

There are certain advantages to the use of the designation system of FIG. 6. This system allows the presentation of the vector position with one less item of information, thus allowing the physician interpreting the analyzer readings to do so with less data to consider.

FIG. 7 illustrates an alternative embodiment of the invention similar to that illustrated in FIG. 2. The circuit of FIG. 7 computes the angles as illustrated in FIG. 6, whereas the circuit of FIG. 2 computes the angles as illustrated in FIG. 5.

The circuit of FIG. 7 is similar to that of FIG. 2. The only change in the FIG. 7 system is the substitution of a $\Theta_{Rz}$ angle computer 65 for $\Theta_{xz}$ angle computer 28 and $\Theta_{yz}$ angle computer 29 in FIG. 2. $\Theta_{Rz}$ computer 65 receives from the output of spatial magnitude computer 10 a signal R having a magnitude proportional to the heart vector magnitude. The other input to computer 65 is a signal Z from amplifier 6. The computer 65 also receives a signal from clock and timing unit 30 and operates in a manner as explained in connection with FIG. 4 to compute the angle between the heart vector and the $z$ axis.

A signal from angle computer 65 is fed to recorder 35 to represent this angle, together with signals from angle computer 27, spatial magnitude computer 10 and spatial derivative computer 11. The recorder provides an output signal directly usable by the physician to determine the condition of the heart of the subject.

Referring again to FIG. 2, a line 70 extending across the recording surface of recorder 35 in a direction perpendicular to the general direction of the recording of the various output signals in FIGS. 2 and 7 is shown. The display is made so that simultaneous events in each of the five (or four) time related signals are aligned with line 70 at the same time. This further aids the physician in easily interpreting the output signals by allowing ready identification of the heart pattern.

The vectorcardiograph analyzer of this invention is compact, portable and easy to use for both clinical and research applications. The analyzer computes the spatial magnitude, spatial derivative and orientation angles of the heart vector and presents them for direct reading to facilitate the rapid diagnosis of heart disease and obviates the need for rote memory of much empirical data which has been developed in connection with the study of heart functioning and has no direct correlation with the electrophysiological operation of the heart. By providing a spatial derivative output, a direct indication is given to distinguish between different heart diseases having similar spatial magnitude wave forms but yielding different derivative outputs.

While the invention has been particularly shown and described with reference to preferred embodiments thereof, it be understood by those skilled in the art that various changes in form and details may be made therein without departing from the spirit and scope of the invention.

I claim:

1. In a vectorcardiograph analyzer comprising:
    a. input means adapted to be connected to a plurality of electrodes affixed to predetermined regions of the body of a test subject for receiving three electrical input signals respectively proportional to the intensity of three components of the heart vector of the subject in three substantially orthogonal directions;
    b. a spatial magnitude computer means responsive to said three electrical input signals for producing an electrical output signal proportional in magnitude to the square root of the sum of the squares of said three components as represented by said three input signals; and
    c. a vector angle computer means responsive to said three electrical input signals for producing a plurality of electrical output signals each proportional in magnitude to a respective one of a plurality of angles which completely define the direction of said heart vector with respect to said orthogonal directions, the improvement comprising:
        d. a spatial derivative computer means responsive to said three electrical input signals for producing an electrical output signal proportional in magnitude to the square root of the sum of the squares of the respective time derivatives of each of said three components; and
        e. a utilization means responsive to each of said output signals.

2. An analyzer according to claim 1 wherein said vector angle computer means further comprises:
    a. a first angle computer for generating a first angle output signal proportional to the angle between a first one of said three components and the projection of said heart vector in the plane of said first one and a second one of said three components; and
    b. a second angle computer for generating a second angle output signal proportional to the angle between the third one of said three components and said heart vector.

3. An analyzer according to claim 1 further comprising a plurality of AC coupled amplifiers adapted to receive inputs from said electrodes and to supply said three electrical input signals to said system.

4. In a vectorcardiograph analyzer comprising means adapted to be connected to a plurality of electrodes affixed to predetermined regions of the body of a test subject for receiving three electrical input signals respectively proportional to the intensity of three components of the heart vector of the subject in three substantially orthogonal directions, the improvement comprising:
 a. time derivative means for receiving each of said three electrical input signals and for generating three derivative signals each respectively proportional to the time derivative of the value of one of said three electrical input signals; and
 b. means responsive to said three derivative signals for generating a resultant derivative signal proportional to the square root of the sum of the respective squares of said three derivative signals.

5. In a vectorcardiograph analyzer comprising means adapted to be connected to a plurality of electrodes affixed to predetermined regions of the body of a test subject for receiving three electrical input signals respectively proportional to the intensity of three components of the heart vector of the subject in three substantially orthogonal directions, the improvement comprising:
 a. a spatial magnitude computer means responsive to said three electrical input signals for producing an electrical output signal proportional in magnitude to the square root of the sum of the squares of said three components as represented by said three input signals;
 b. a vector angle computer means responsive to said three electrical input signals for generating a plurality of electrical output signals each proportional in magnitude to a respective one of a plurality of angles which completely define the direction of the heart vector with respect to said orthogonal directions; and
 c. said vector angle computer means using circuits for generating said plurality of electrical output signals which are independent of the circuits of said spatial magnitude computer means generating the output signal.